US012521725B2

(12) United States Patent
Imhof

(10) Patent No.: US 12,521,725 B2
(45) Date of Patent: Jan. 13, 2026

(54) MINERAL LIBERATION MACHINE

(71) Applicant: Maelgwyn Mineral Services Limited, Cardiff (GB)

(72) Inventor: Rainer Maria Imhof, Tostedt (DE)

(73) Assignee: Maelgwyn Mineral Services Limited, Cardiff (GB)

( * ) Notice: Subject to any disclaimer, the term of this patent is extended or adjusted under 35 U.S.C. 154(b) by 463 days.

(21) Appl. No.: 18/009,255

(22) PCT Filed: Jun. 10, 2021

(86) PCT No.: PCT/EP2021/065722
§ 371 (c)(1),
(2) Date: Dec. 8, 2022

(87) PCT Pub. No.: WO2021/250216
PCT Pub. Date: Dec. 16, 2021

(65) Prior Publication Data

US 2023/0234069 A1 Jul. 27, 2023

(30) Foreign Application Priority Data

Jun. 10, 2020 (GB) ..................................... 2008822

(51) Int. Cl.
*B02C 17/16* (2006.01)
*B02C 7/04* (2006.01)
(Continued)

(52) U.S. Cl.
CPC .............. *B02C 17/163* (2013.01); *B02C 7/04* (2013.01); *B02C 7/08* (2013.01); *B02C 23/36* (2013.01)

(58) Field of Classification Search
CPC ......... B02C 17/163; B02C 17/16; B02C 7/04; B02C 7/08; B02C 7/14; B02C 23/36; B02C 23/40
See application file for complete search history.

(56) References Cited

U.S. PATENT DOCUMENTS 3,307,792 A * 3/1967 Harold .................... B01F 27/93 241/179
4,730,789 A * 3/1988 Geiger .................... B02C 17/16 241/171
(Continued)

FOREIGN PATENT DOCUMENTS

| | | |
|---|---|---|
| CN | 204523168 | 8/2015 |
| CN | 208599931 | 3/2019 |
| EP | 3050628 A1 | 8/2016 |

OTHER PUBLICATIONS

UKIPO Search Report for GB2008822.5 dated Dec. 6, 2021.
(Continued)

*Primary Examiner* — Mohammed S. Alawadi
(74) *Attorney, Agent, or Firm* — Cook Alex Ltd.

(57) ABSTRACT

A mineral liberation machine comprising vertical wet grinding mill (10) for grinding coarse material comprising a cylindrical housing (14) containing a rotatable shaft (15) creating an annular channel (17) with an input feed (16) for supplying coarse material and an output feed (18) for withdrawing ground product, in which the rotatable shaft (15) is equipped with a plurality of rotor discs (20) and the cylindrical housing (14) is equipped with one or more stators or stator discs (22), the discs (20, 22) on the rotatable shaft (15) and cylindrical housing (14) are interleaved such that the ratio of the height of the housing (14) to the diameter of the housing (14) is low with the diameter to height ratio being between 0.6-1.2.

20 Claims, 8 Drawing Sheets

(51) Int. Cl.

| | |
|---|---|
| ***B02C 7/08*** | (2006.01) |
| ***B02C 7/14*** | (2006.01) |
| ***B02C 23/36*** | (2006.01) |
| ***B02C 23/40*** | (2006.01) |

(56) References Cited

U.S. PATENT DOCUMENTS

| | | | |
|---|---|---|---|
| 4,747,550 A | 5/1988 | Jackering | |
| 2018/0036738 A1* | 2/2018 | Tan | B02C 7/11 |

OTHER PUBLICATIONS

International Search Report for PCT/EP2021/065722 dated Dec. 3, 2021.
IPRP for PCT/EP2021/065722 dated Oct. 18, 2022.

* cited by examiner

Not rotating housing with disks

MINERAL LIBERATION MACHINE

CROSS-REFERENCE TO RELATED APPLICATIONS

This application is a U.S. National Stage of International Patent Application No. PCT/EP2021/065722, filed Jun. 10, 2021, which claims the benefit of and priority to British Patent Application No. 2008822.5, filed Jun. 10, 2022, both of which are hereby incorporated by reference in their entirety.

TECHNICAL FIELD

The present invention relates to a mineral liberation machine comprising wet a grinding mill and blades therefor.

BACKGROUND

There are two different but principally similar designs for ultra-fine wet grinding mills. The first being the horizontally operating mill which uses a horizontal shaft equipped with discs. The rotating speed of the discs turns the coarse material comprising the material to be ground and grinding media, normally ceramic material referred to as beads, creating a centrifugal field with high pressure on the annular milling areas ensuring the grinding effect. To keeping the annular milling ring stable the speed of the tip of the discs range around 20 m/s and more. The friction between the coarse material and the discs causes abrasion as a result the discs are made of polyurethane to reduce maintenance costs.

As a result of the horizontal design and the influence of the high centrifugal forces needed to build this annular grinding area, the volume in the mill active for grinding is small compared to the total volume of the mill.

The second design is a vertical disc mill. The main advantage of this design is that the full volume of the mill is operational for grinding. But in reality, the mill has similar shape to the horizontal mill only turned through 90°. Tip speeds of the discs as high as 15-17 m/s are needed to have effective grinding. For this reason, polyurethane is also used for the discs.

Both mill constructions operate without counter discs. The force for accelerating the coarse material is produced by the friction between the coarse material and the surface of the discs. Most of the energy consumed for grinding is converted in to heat and only a small percentage used for breaking the coarse material. This is a problem for polyurethane discs, since they are sensitive to heat.

An alternative vertically operating mill is used for grinding soft materials like limestone or chalk. These mills are grinding ultra-fine particles with a diameter of below 1 micron. This construction of mill has counter discs, fixed on the housing of the mill. The special feature of this mill is that it is very slim (0.65-1.3 m diameter) and rather high. The height to diameter ratio needs speeds close to 20 m/s to create enough centrifugal force. Since only soft material is ground steel discs (and steel counter discs) are used, which have acceptable tool lifetimes.

The discs have a flat shape and their surfaces are smooth. As the heights of such mills are high, 5 m or more, the hydraulic pressure at the bottom of the mill is high and favours efficient milling in the bottom part. This results in the bottom part of the mill suffering the highest wear.

The bead size of the grinding media, with solid densities of up to 6.3 g/cm$^3$, are not uniform in but covers a distribution between 0.5 mm and 3 mm. This is due to the wear of the beads during milling when the worn beads have to be refilled in the mill more or less frequently with new beads with a size of around 3 mm. As such larger beads remain closer to the bottom of the mill and the small beads between 0.5 and 1 mm beads are more likely to stay in the top of the milling region. This leads to a vertical gradient of the size distribution of the beads.

SUMMARY

It is an aim of the present invention to address these problems and supply a more efficient wet grinding mill.

Accordingly the present invention is directed to a mineral liberation machine comprising vertical wet grinding mill for grinding coarse material comprising a cylindrical housing containing a rotatable shaft creating an annular channel with an input feed for supplying coarse material and an output feed for withdrawing ground product, in which the rotatable shaft is equipped with a plurality of rotor discs and the cylindrical housing is equipped with one or more stators or stator discs, the discs on the rotatable shaft and cylindrical housing are interleaved such that the ratio of the height of the housing to the diameter of the housing is low with the ratio being between 0.6-1.2.

In a preferred embodiment the rotatable shaft is equipped with a rotating drum, which holds the rotor discs.

This has the advantage of limiting the size of the annular channel. As a result of using different drum sizes the width of the annular channel can be varied. This provides the advantage that there is no grinding room in the centre of the mill, since close to the centre there is no relative efficient grinding speed for the coarse material. A low circular speed wastes energy without achieving grinding effect. Therefore in the annular channel speeds and centrifugal forces do not differ significantly from the inner to the outer diameter of the annular channel, thus producing a more efficient grinding or milling zone.

Advantageously the discs have one or more blades. The blades preferably are wedge shaped or have triangular raised portions. The apex of the triangle may point towards the centre of the mill. The blades have one or more gaps between them, which advantageously comprise 40 to 100% of the size of the blade. The blades on the rotor and stator discs cooperate when rotating to create gaps in the annular channel to allow the coarse material to pass through. The plough like effect of the wedge shaped blades narrowing and widening of the gap between the blades on the rotor and the stator discs means that the coarse material is pressed together more and more, and receives the significant stress resulting in effective grinding. This is achieved with tip speeds far less than needed and used in previously proposed horizontal and vertical fine grinding mills.

The vertical distance between two rotor or stator blades is 10 to 20 times the size of the grinding media and the height of the centre of the blades is 20 to 50% of the vertical distance between the blades. Therefore, for example the vertical distance between the blades is 95 mm, and when the rotor blade is between two stator blades the distances between rotor and stator blades is narrowed to 35 mm, this squeezes the coarse material with less speed to a high stress.

Preferably the discs are made from steel material.

This provides the advantage that a mill with steel discs can grind abrasive materials like ores and not only limestone. Furthermore the mill can operate with much lower tip speeds than previously proposed mill constructions minimising the wear of the grinding discs as flat and smooth disc surfaces need impart a high differential speed to the coarse material to accelerate it for efficient grinding. The grinding discs are enabled to grind with lower specific energy consumption by using tip speeds of the discs in the range of 3-6 m/s.

Advantageously the housing and the rotating shaft are sized such that the width of the discs is relatively small. The rotating shaft or the drum forming the inner boundary of the annular channel has a diameter of 0.5 R to 0.7 R where R is the diameter of the inside of the cylindrical housing. Preferable the diameter of the shaft or the drum is about 0.6 R.

The active grinding zone is a relatively small cylindrical space with low speeds (4 m/s) at the inside of the annular space and 6 m/s at the outside of the annular channel. The ratio of 6/4 is small. In conventional vertical designs the ratio is for example 20/5 m/s where close to the shaft there is little stress on the coarse material, therefore little grinding activity and energy is wasted. The operating room in the present invention is like a carrousel.

In the bottom of a wet grinding mill the closest free distance between stator and rotor blades is 35 mm, the ratio 35 mm distance/3 mm bead size is 11.6 correspondingly to effective milling. However in the top of the mill with a bead size of 1 mm (or even 0.5 mm) the ratio is 35/1=35. This results in less effective milling in the top region.

Therefore, advantageously the closest free distance between rotor and stator discs should decrease step by step with the height in the mill. Close to the top of the mill, the free distance should be reduced from 35 to 15 mm for enabling efficient grinding in this top region of the mill.

In a preferred embodiment at the bottom of the mill the rotor and stator blades have wedge angles of around 10-12° since the hydraulic pressure due to the heavy milling suspension-beads and particles—is in the bottom much higher than in the top of the mill. Close to the top of the mill the hydraulic pressure is less, preferably the blades here have higher wedge angles of 20-25° to increase the impact on the smaller beads in the top region.

It is also advantageous to increase the numbers of blades of each rotor and stator from bottom to top of the mill in order to increase the number of impacts per rotation of the disc for the reasons of reduction in bead size as the course material rises in the annular space.

In a preferred embodiment not only the active milling region (the region below the top stator and rotor disc respectively) is filled with beads but also beads pass higher than these top discs. In this case there is no milling activity in the region above the discs, but these beads increase the hydraulic pressure onto the active milling region which improves the efficiency of grinding. It also enables additionally the mill to operate with lower tip speeds of the rotor blades which is of benefit for the wear of the disc blades.

Advantageously the inside of the cylindrical housing and the outside of the drum or the shaft are equipped with vertical grooves. This provides the advantage that beads go into these grooves and serve as their own wear protection.

BRIEF DESCRIPTION OF THE DRAWINGS

Examples of wet grinding mills made in accordance with the present invention will now be discussed hereinbelow with reference to the accompanying drawings, in which.

DETAILED DESCRIPTION OF THE PREFERRED EMBODIMENTS

Figure 1:
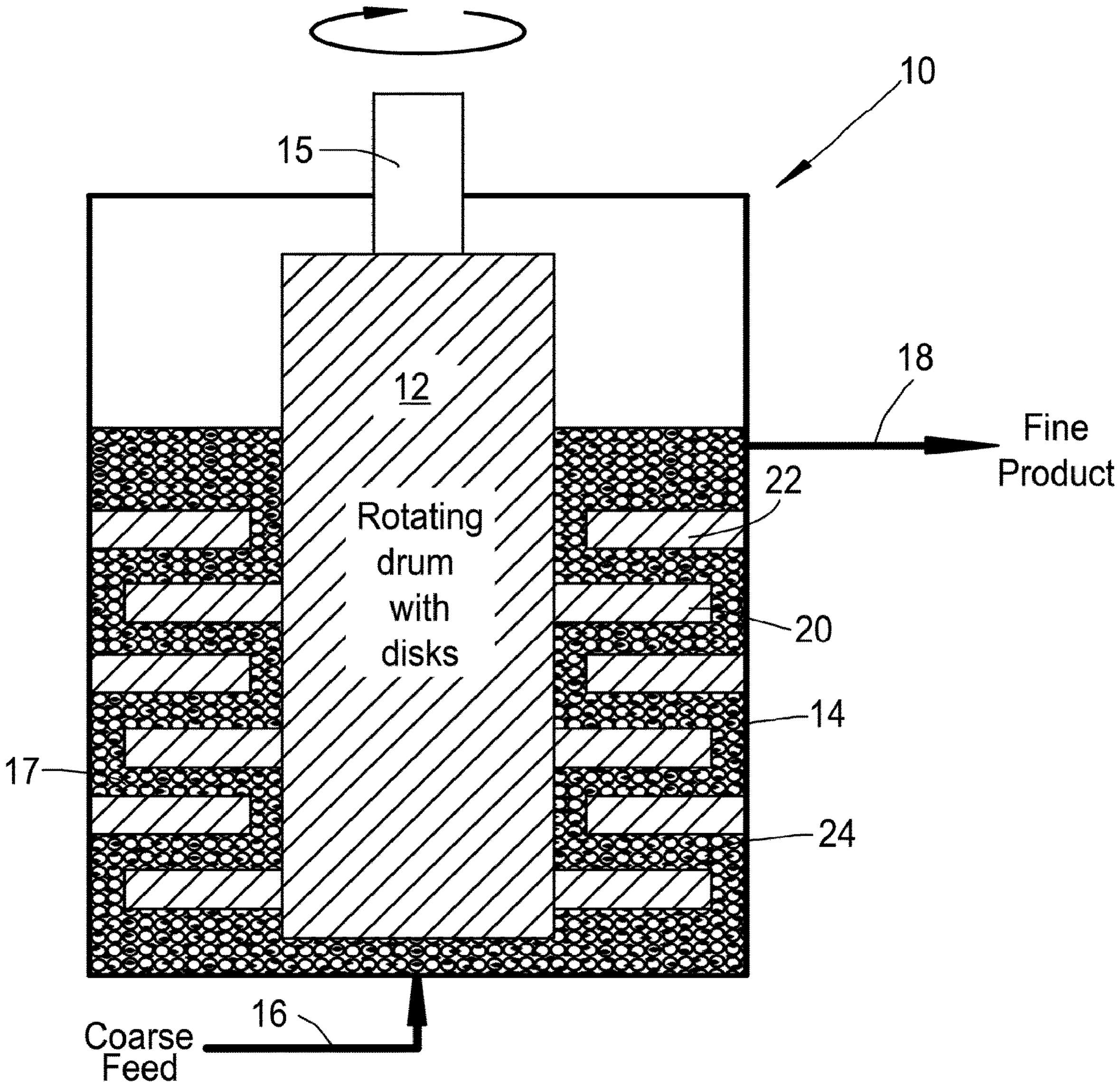
FIG. 1 shows a cross-sectional plan view of a grinding mill according to the present invention.

FIG. 1 shows a side sectional view of a wet grinding mill 10 according to the present invention. The grinding mill 10 comprises a cylindrical housing 14 containing a rotatable shaft 15. The rotatable shaft 15 is equipped with a drum 12. The rotatable shaft 15 is rotated by an external motor not shown. The rotating drum 12 is equipped with a number of rotor discs 20 in this case three. The cylindrical housing 14 is equipped with a number of stators or stator discs 22 in this case three. The discs 20, 22 are interleaved such that the discs 20, 22 next to each other overlap. The space between the rotating drum 12 and the cylindrical housing 14 comprises an annular channel 17. The cylindrical housing 14 is equipped at its bottom with an input channel 16 for supplying coarse material. The coarse material is slowly ground by the action of the rotors and stators 20, 22 as it rises in the annular channel 17. The input channel 16 is supplied by a pump means ensuring a set rate of flow of coarse material 24 into the cylindrical housing 14, when working, filling it to above the top stator or rotor disc 20, 22. The coarse material 24 is given rotational acceleration by the rotors 20 and is moved upwards through the annular channel 17 as more coarse material is added. The compression action between the discs 20, 22 and the gravitation pressure on the coarse material grind it during its pass through the annular channel 17. The ground fine material is withdrawn from the cylindrical housing 14 by output channel 18 on its side, which is above the top rotor or stator 20, 22. This is achieved by the rotational speed imparted to the material by the rotors 20.

Figure 2:
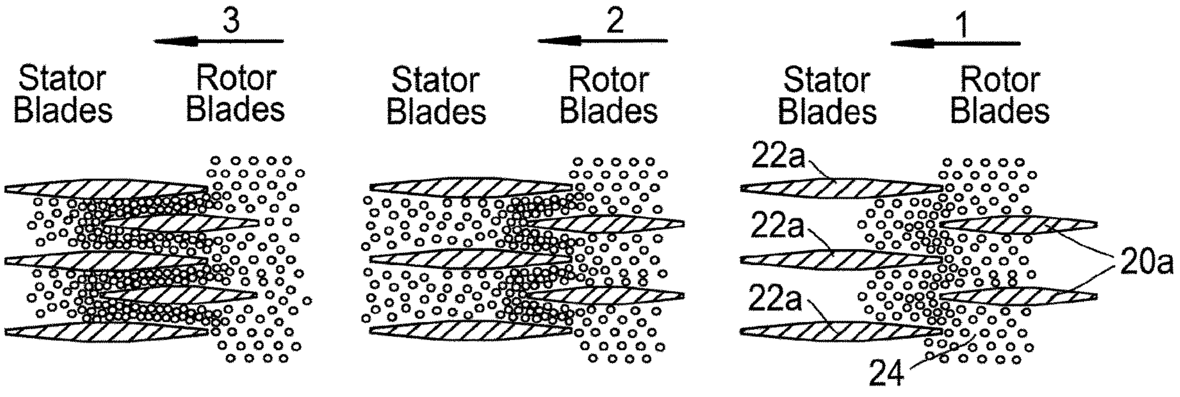
FIG. 2 shows the schematic side view of stator and rotor blades according to the present invention in use.

FIG. 2 shows diagrammatically the action of rotor and stator blades 20*a*, 22*a*, a number of which are attached to each rotor and stator disc 20, 22 when in use. FIG. 2 shows the same section moving from the right-hand side to the left hand side at three different times as the rotor blades 20*a* rotate. The cross section and shape of rotor and stator blades 20*a*, 22*a* vary around their circular discs 20, 22. In the section concerned it will be appreciated the stator blades 22*a* do not move and therefore their cross-section remains constant. As the varying shape of the rotor blades 20*a* passes the stator blades 22*a* the gap between them diminishes compacting the coarse material 24 imparting energy and angular acceleration thereto thus causing grinding to occur.

Figure 3:
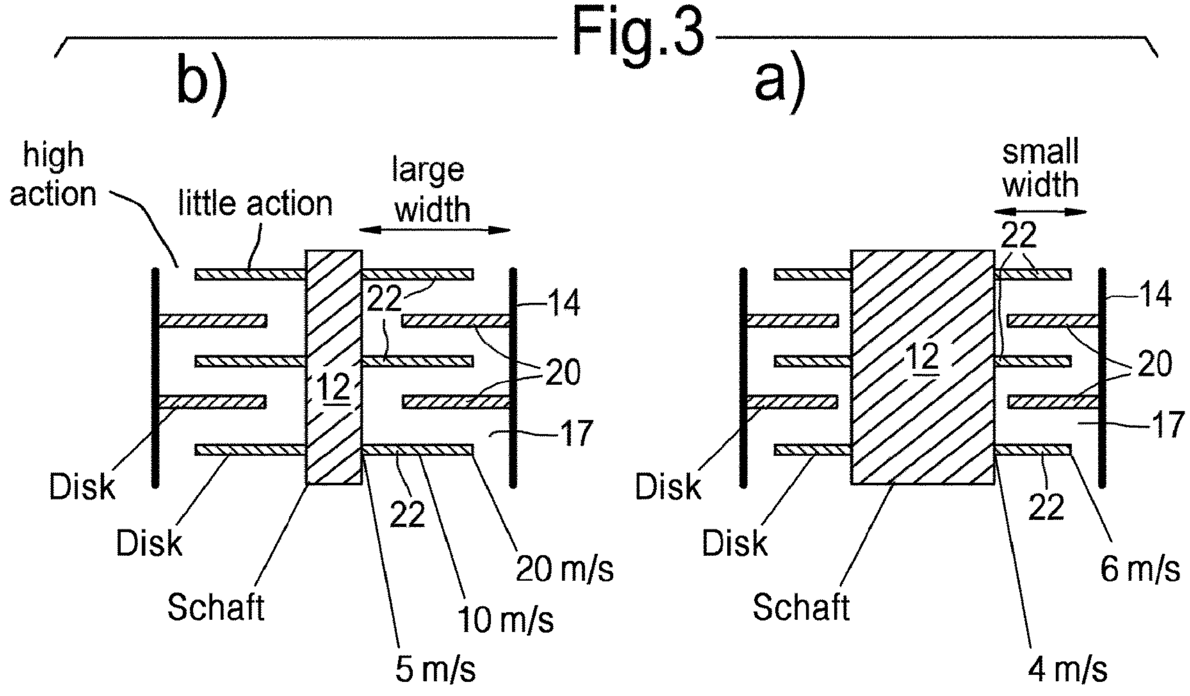
FIG. 3 shows a cross-sectional plan view of a previously proposed grinding mill alongside a similar view of a grinding mill according to the present invention.

FIG. 3 shows sections of two grinding mills side-by-side. FIG. 3*a* is a grinding mill according to the present invention and FIG. 3*b* is a previously proposed grinding mill. The internal layout of these two mills is substantially as described in FIG. 1. The principal difference is that the cylindrical drum 12 as shown in FIG. 3*a* is substantially larger in the present invention than the shaft 15 in the previously proposed grinding mill. This results in the horizontal cross-sectional size of the discs 20, 22 being smaller. Furthermore, the cylindrical space between the drum 12 and the annular channel 17 is small. This results in the speed of rotation of coarse material in the annular channel 17 space having less difference between the outside and the inside, with the speed close to the cylindrical housing 14 being 6 m/s and close to the drum 12 being 4 m/s. This leads to considerably more constant grinding action. In the previously proposed grinding mill shown in FIG. 3*b* the width between the drum 12 and the cylinder 14 is wide, with the result that the speed close to the drum 12 is 5 m/s, in the middle of the space is 10 m/s and on the outside is 20 m/s. This means that significant amounts of energy are used in accelerating the coarse material, rather than achieving grinding.

Figure 4:
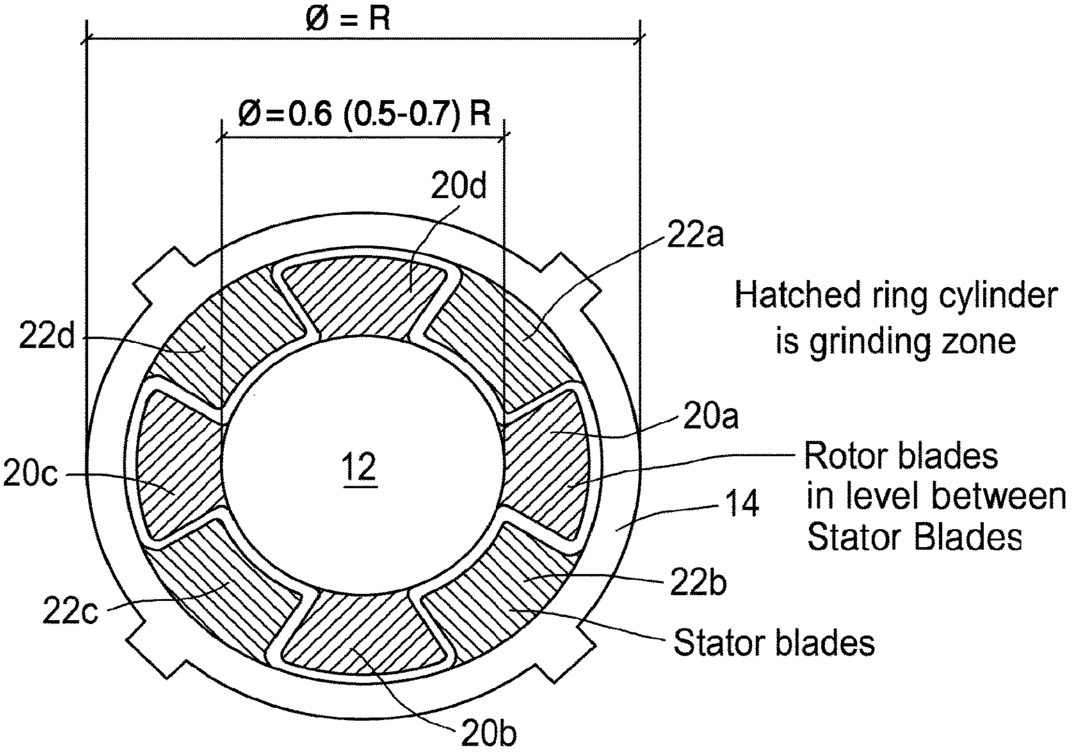
FIG. 4 shows a top view of a grinding mill according to the present invention.

FIG. 4 shows a view inside the grinding mill 10 looking from the top. This shows the drum or shaft 12 in the centre surrounded on the outside by the cylindrical housing 14. The hatched area in between comprises the grinding or milling zone. The top rotor disc 20 can be seen which comprises four rotor blades 20*a*, 20*b*, 20*c* and 20*d* below which can be seen the stator disc 22 similarly equipped with four blades 22*a*, 22*b*, 22*c* and 22*d*. In this instance the blades of the rotor disc 20 and the stator disc 22 effectively fill complete a full circular portion. As shown in the Figure the diameter of the inside of the cylindrical housing 14 comprises a distance R. The diameter of the drum or shaft 12 comprises a range of 0.5 to 0.7 R and preferably 0.6 R.

Figure 5:
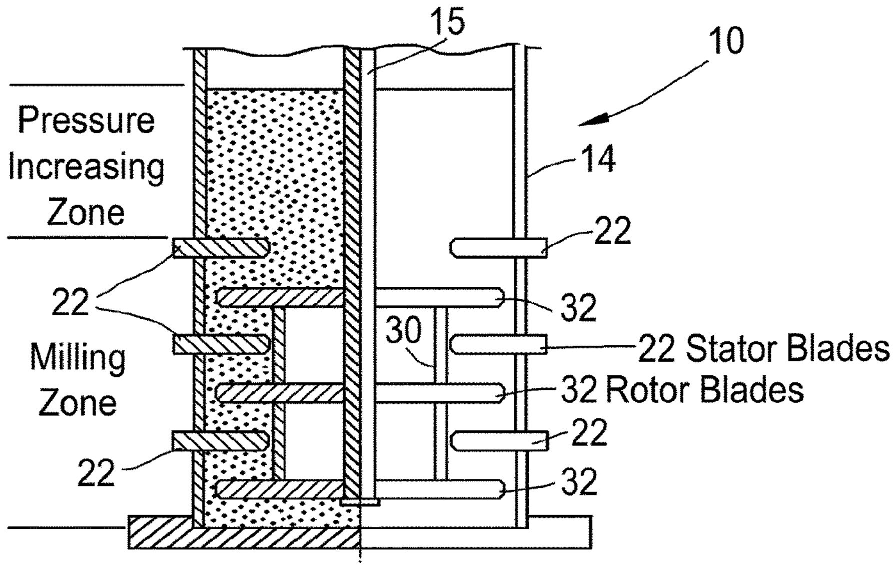
FIG. 5 shows a cross-sectional side view of a grinding mill according to the present invention.

FIG. 5 shows a sectional view of a modified grinding mill 10 according to the present invention. The rotatable shaft 15 is equipped with three discs 32, which fit directly onto the shaft 15. Between each of the discs 32 is a circular spacer 30 which spaces the discs 32 apart from each other and creates a structure similar to the drum 12 in FIG. 1. The top disc 32 and the bottom disc 32 create the top and bottom of the drum like structure. The distance between the edge of the circular spacers 30 and the edge of the cylindrical housing 14 creates a milling zone. In the case of this embodiment the outlet for the fine material is significantly above the top rotor disc 32. The ground material including the heavy beads here creates a pressure zone. Therefore, the coarse material in the milling zone is put under pressure thereby increasing the grinding effect.

Figure 6:
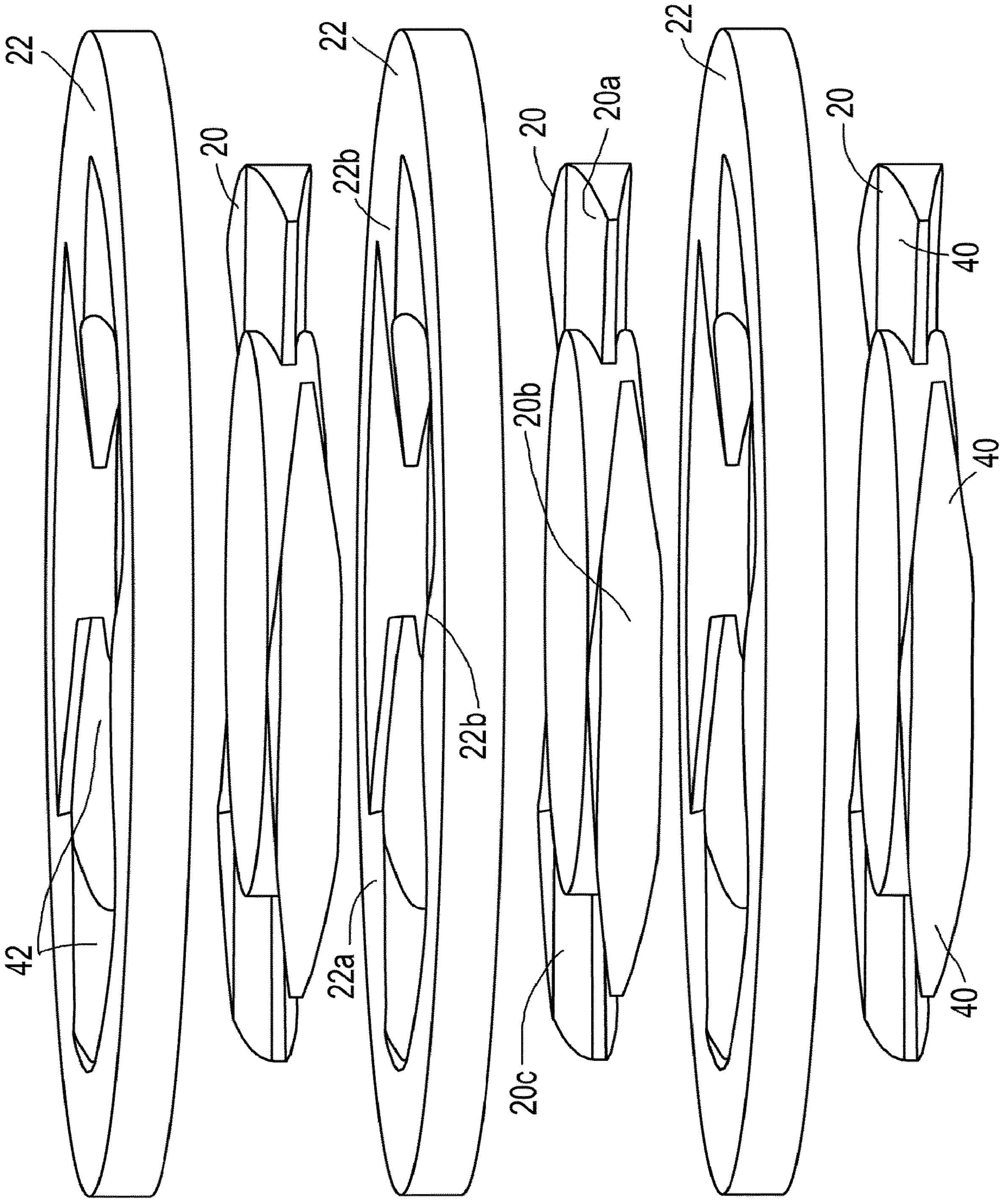
FIG. 6 shows a side perspective view of a stack of grinding discs according to the present invention.

FIG. 6 shows a perspective view of a stack of three rotor discs 20 interleaved with three corresponding stator discs 22. Each rotor disc 20 comprises a central disc part, which joins onto the rotatable shaft 15 or drum 12, which is equipped with three equally spaced blades 20*a*, 20*b*, 20*c* on its outside. Similarly each stator disc 22 comprise a circular outer part, which joins onto the cylindrical housing 14, which is equipped with three equally spaced blades 22*a*, 22*b*, 22*c* on its inside. There is a space between each of the blades to enable coarse material to pass up the milling zone. The structure of each blade can be seen and is similar for both the stator and rotor blades, comprising wedges 40, 42 at front and back of each blade. The purpose of the wedges 40, 42 is to guide and compress the coarse material thus increasing the grinding effect.

Figure 7:
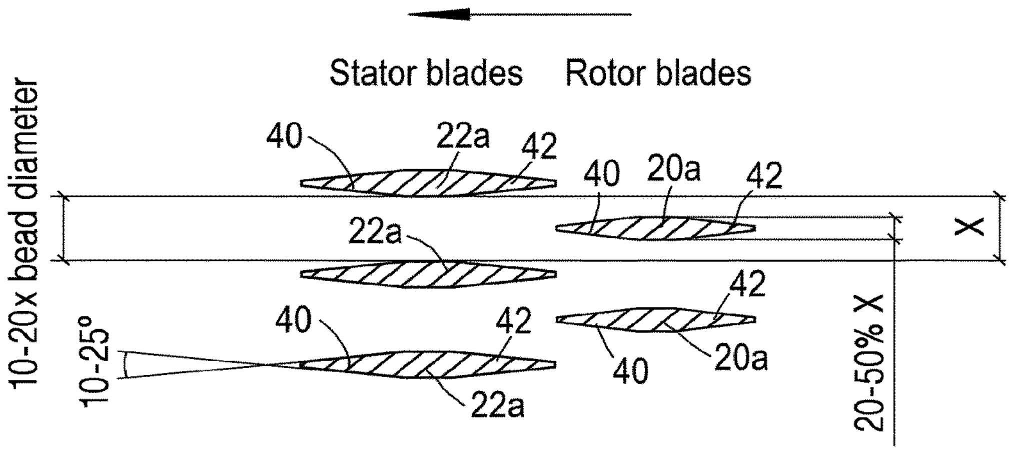
FIG. 7 shows a side cross-sectional view of stator and rotor blades according to the present invention.

FIG. 7 shows a cross-section of the blades 20*a*, 22*a* similar to that shown in FIG. 2. The shape of the blades 20*a*, 22*a* described in FIG. 6 is clearly visible with the wedges 40, 42 front and back of the blades 20*a*, 22*a*. The Figure shows the front of the wedge 40 has an angle of 10 to 25° between the top and bottom surfaces. The distance X between each blade 20*a*, 20*a* or 22*a*, 22*a* in the stack is 10 to 25 times the diameter of the top beads size. The distance from top to bottom surface of the middle of a blade 20*a*, 22*a* is 20 to 50% X.

Figure 8:
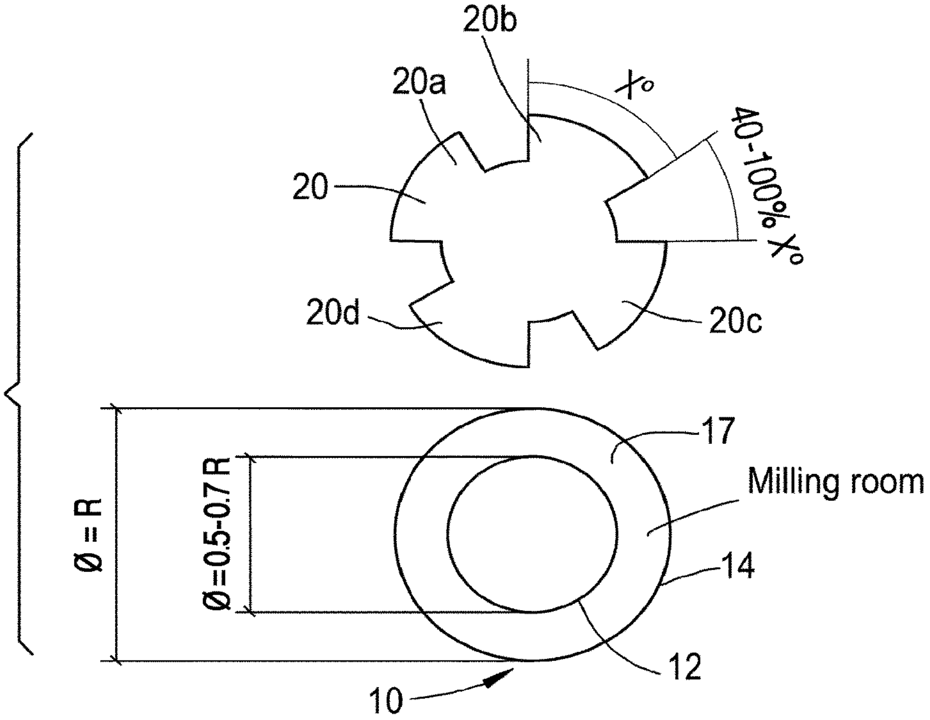
FIG. 8 shows top plan views of a grinding mill and a rotor blade according to the present invention.

FIG. 8 shows on the left a section through the grinding mill 10. This shows the inside edge of the cylindrical housing 14 and the outside edge of the drum 12. The space between these two comprises the annular channel 17, which is the milling zone or room. The diameter of the inside of the cylindrical housing 14 is R and the size of the outside of the drum 12 is 0.5 to 0.70 R. On the eft hand side is shown a rotor disc 20. The disc 20 is equipped with four blades 20*a*, 20*b*, 20*c*, 20*d*. The angular space taken up by each blade comprises X°. The distance between each blade 20*a*, 20*b*, 20*c*, 20*d* is 40 to 100% of X°.

Figure 9:
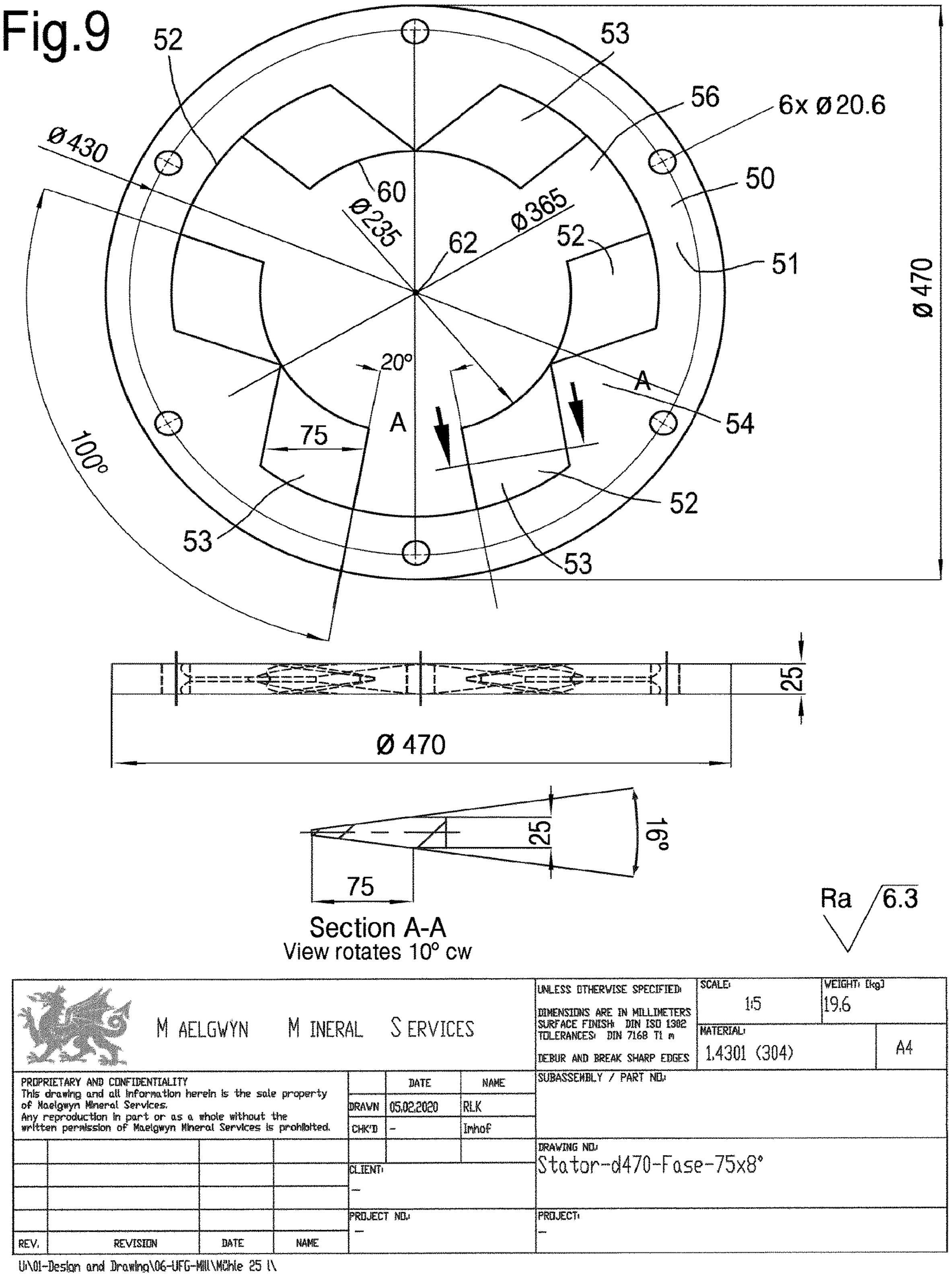
FIG. 9 shows a top plan view and a cross-sectional view of a stator disc according to the present invention.

FIG. 9 shows a top view of a stator disc 50. The stator disc 50 has a circular space in its centre through which would pass the rotating shaft 15 holding the drum 12. The stator disc 50 has an outside circular part 51 which attaches to the inside of the cylindrical housing 14 and is equipped with three identical blades 53. Each blade 53 has a centre section 54 with a cross-section that matches the circular disc 51 and two wedges 52 on either side. The centre section 54 comprises a triangle with the apex pointing towards the centre axis 62 of the stator disc 50. If a section A-A is examined it can be seen that the edge of the wedge has bisects an angle of 16°. Each blade takes up 100° of the circumference of the axis 62 with the spaces 56 comprising 20° each.

Figure 10:
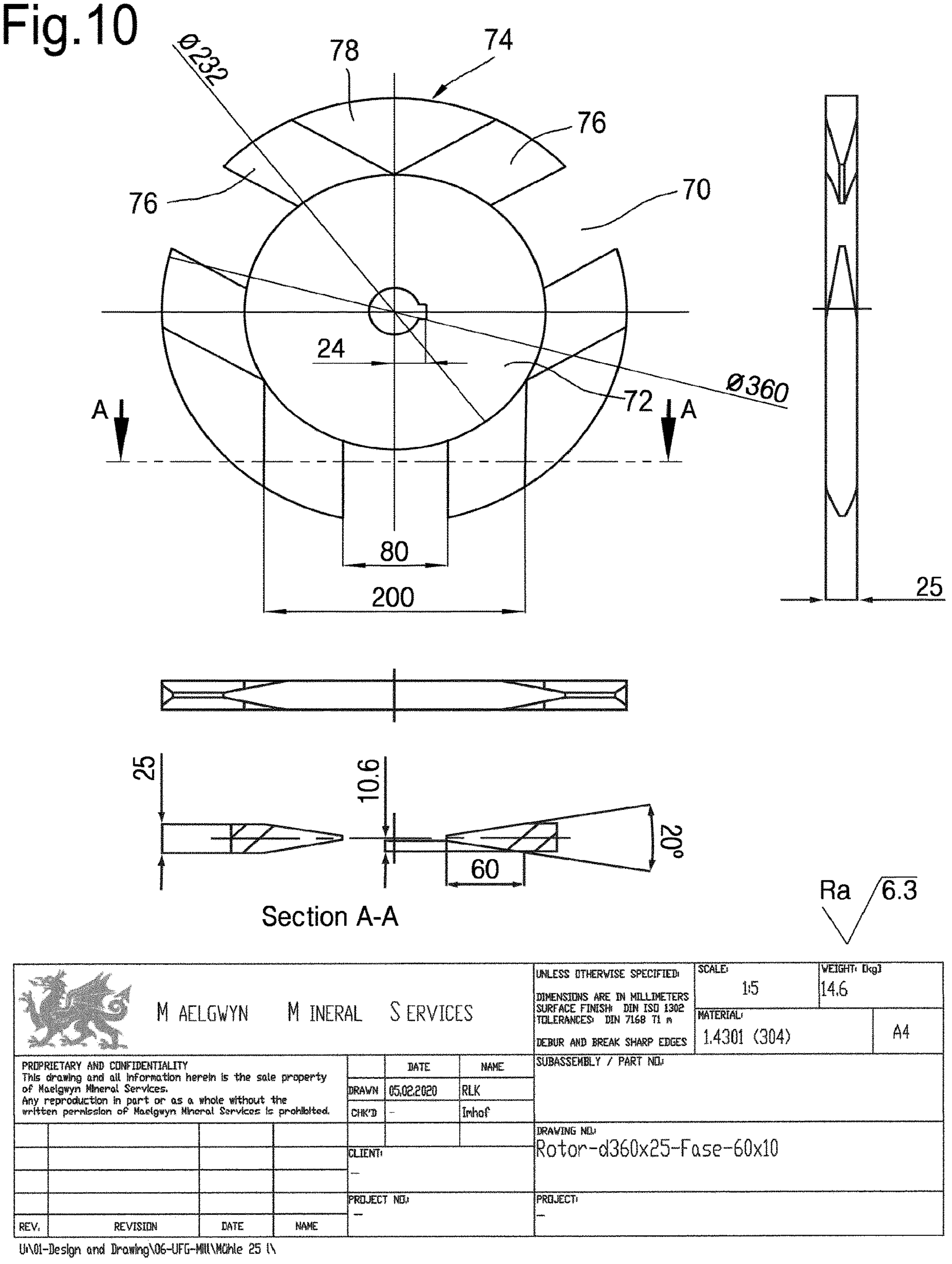
FIG. 10 shows a top plan view and a cross-sectional view of a rotor disc according to the present invention.

FIG. 10 shows a top view of a rotor disc. The rotor disc has through it a rotating shaft 70 surrounded by a part drum 72. The drum part 72 is equipped with three identical blades 74. Each blade 74 has a centre section 78 with a cross-section that matches the circular disc 72 and two wedges 72 on either side. The centre section 74 comprises a triangle with the apex pointing inwards towards the axis of the rotatable shaft 70. If a section A-A is examined it can be seen that the edge of the wedge has bisects an angle of 20°. Each blade 74 has edges parallel to the edges of the next blade 74. The edges of the blades 74 are also parallel to the sides of the triangle that forms the centre section 78.

Figure 11:
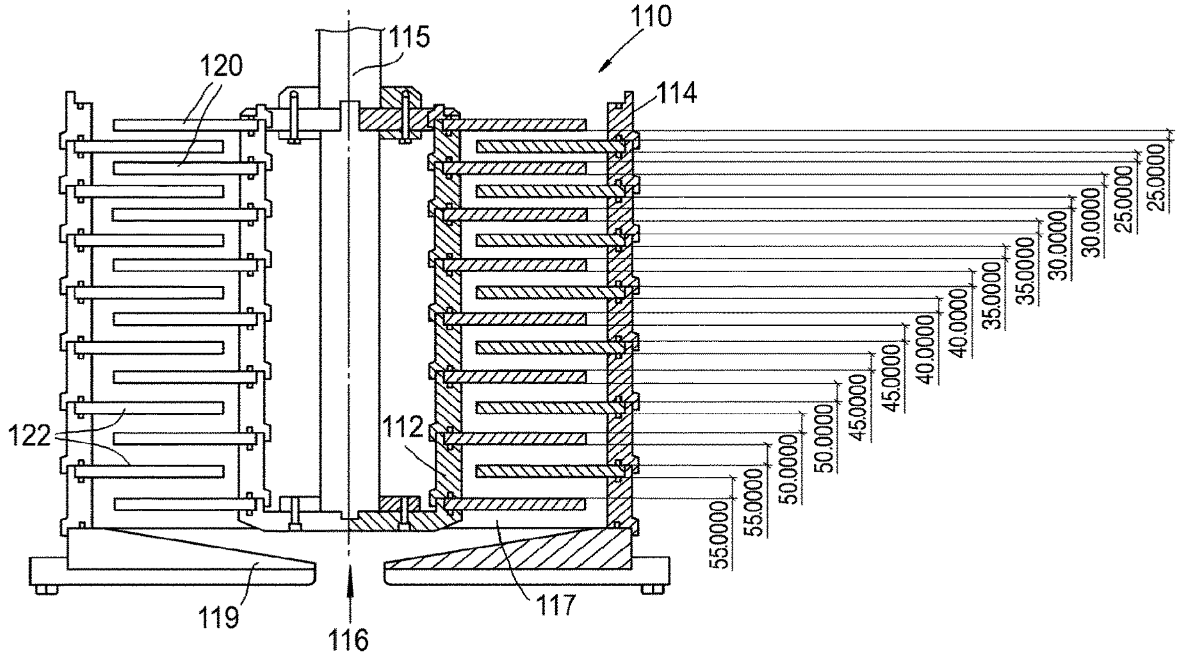
FIG. 11 shows a cross-sectional plan view of a modified grinding mill according to the present invention.

FIG. 11 shows a side sectional view of a modified wet grinding mill 110 according to the present invention. The grinding mill 110 comprises a cylindrical housing 114 containing a rotatable shaft 115. The rotatable shaft 115 is equipped with a drum 112. The rotatable shaft 115 is rotated by an external motor not shown from above. The rotating drum 112 is equipped with eight rotor discs 120. The cylindrical housing 114 is equipped with seven stators or stator discs 122. The discs 120, 122 are interleaved such that the discs 120, 122 next to each other overlap. The space between the rotating drum 112 and the cylindrical housing 114 comprises an annular channel 117. The cylindrical housing 114 is equipped at its bottom with an input channel 116 for supplying coarse material. The input channel 116 is surrounded by an annular slope 119 at the bottom of the cylindrical housing 114, which in conjunction with the bottom of the drum 112 directs the course material into the annular channel 117 and the discs 120, 122. The coarse material is slowly ground by the action of the rotors and stators 120, 122 as it rises in the annular channel 117. As the coarse material rises up the annular channel 117 the size of the beads is reduced by the grinding action. This leads to the ratio of the bead size to the gap between the discs 120, 122 increasing. Thus compression action between the discs 120, 122 and the gravitation pressure on the coarse material grinding it during its passage through the annular channel 117 decreases towards the top of the grinding mill 110. Therefore in this embodiment the distance between each stator and rotor disc 120, 122 is decreased as the top of the mill is reached. Therefore in this embodiment starting at the bottom the gap distances are 55 mm, 55 mm, 50 mm, 50 mm, 45 mm, 45 mm, 40 mm, 40 mm, 35 mm, 35 mm, 30 mm, 30 mm, 25 mm and 25 mm. This leads to a more even grinding effect as the coarse material rises up the mill 110.

Figure 12:
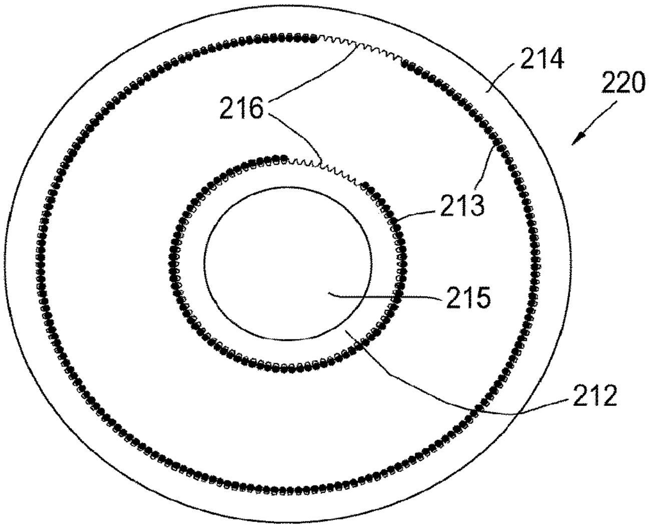
FIG. 12 shows a top view of a modified grinding mill according to the present invention.

FIG. 12 shows a view inside a modified grinding mill 210 looking from the top. This shows a shaft 112 equipped with a drum 212 in the centre surrounded on the outside by a cylindrical housing 214. The inside of the cylindrical housing 214 and the outside of the drum 212 both have vertical grooves 216. When the coarse material is passing up the mill 210 the beads 218 fit into the groove reducing the wear on the beards 218.

The invention claimed is:

1. A mineral liberation machine comprising a vertical wet grinding mill for grinding coarse material, wherein the vertical wet grinding mill comprises a cylindrical housing containing a rotatable shaft creating an annular channel with an input feed for supplying the coarse material and an output feed for withdrawing ground product, wherein the rotatable shaft is equipped with a plurality of rotor discs, and the cylindrical housing is equipped with one or more stator discs, wherein the plurality of rotor discs and the one or more stator discs are interleaved such that a ratio of a height of the cylindrical housing to a diameter of the cylindrical housing is low with the ratio being between 0.6-1.2.

2. The mineral liberation machine according to claim 1, wherein the rotatable shaft is equipped with a rotating drum, wherein the rotating drum holds the plurality of rotor discs.

3. The mineral liberation machine according to claim 2, wherein an inside of the cylindrical housing and an outside of the rotating drum or the rotatable shaft are equipped with vertical grooves.

4. The mineral liberation machine according to claim 1, wherein each of the plurality of rotor discs and the one or more stator discs have one or more blades.

5. The mineral liberation machine according to claim 4, wherein each of the one or more blades have a wedge shape or have triangular raised portions.

6. The mineral liberation machine according to claim 5, wherein an apex of each of the triangular raised portions points towards a centre of the mill.

7. The mineral liberation machine according to claim 5, wherein at a bottom of the mill the wedge shape of each of the one or more blades of the plurality of rotor discs and each of the one or more blades of the one or more stator discs have wedge angles of about 10-12°.

8. The mineral liberation machine according to claim 5, wherein close to a top of the mill the wedge shape of each of the one or more blades of the plurality of rotor discs and each of the one or more blades of the one or more stator discs have wedge angles of 20-25°.

9. The mineral liberation machine according to claim 4, wherein each of the one or more blades of the plurality of rotor discs including at least two blades, and each of the one or more blades of the one or more stator discs including at least two blades; wherein one or more gaps is formed between the respective at least two blades of each of the plurality of rotor discs and one or more gaps is formed between the respective at least two blades of the one or more stator discs.

10. The mineral liberation machine according to claim 9, wherein each blade of each of the plurality of rotor discs and of the one or more stator discs has a size defined by a horizontal cross-section of the respective blade and each of the gaps between the respective blades comprises 40% to 100% of the size of one of the blades.

11. The mineral liberation machine according to claim 4, wherein the one or more blades of the plurality of rotor discs and the one or more blades of the one or more stator discs cooperate when rotating to create gaps in the annular channel to allow the coarse material to pass through.

12. The mineral liberation machine according to claim 4, further comprising grinding media having a size and wherein the one or more blades of each of the plurality of rotor discs further comprises at least two blades, and the one or more blades of the one or more stator discs further comprises at least two blades of at least two stator blades; and wherein a vertical distance between the at least two blades of the plurality of the rotor discs or between the at least two blades of the at least two stator discs is 10 to 20 times the size of the grinding media and a height of a centre of the blades is 20% to 50% of the vertical distance.

13. The mineral liberation machine according to claim 4, wherein the one or more blades of the plurality of rotor discs and the one or more blades of the one or more stator discs increase in number from a bottom to a top of the mill.

14. The mineral liberation machine according to claim 1, wherein each of the plurality of rotor discs and the one or more stator discs is made from steel material.

15. The mineral liberation machine according to claim 1, wherein the cylindrical housing and the rotatable shaft are sized such that a width of each of the plurality of rotor discs is smaller than a width of each of the one or more stator discs.

16. The mineral liberation machine according to claim 1, wherein the rotatable shaft or a drum on the rotatable shaft forms an outermost inner boundary of the annular channel having a diameter of 0.5R to 0.7R wherein R is an inside diameter of the cylindrical housing.

17. The mineral liberation machine according to claim 16, wherein the diameter of the rotatable shaft or the drum that forms an outermost inner boundary of the annular channel is about 0.6R.

18. The mineral liberation machine according to claim 1, wherein the one or more stator discs further comprises at least two stator discs; and a closest free distance between one of the plurality of rotor discs and one of the at least two stator discs decreases step by step as each stator disc or rotor disc occupies a higher position within the mill.

19. The mineral liberation machine according to claim 18, wherein the closet free distance is reduced from 35 mm near a bottom of the mill to 15 mm close to a top of the mill.

20. The mineral liberation machine according to claim 1, wherein an active milling region is defined below a top one of the one or more stator discs and a top one of the plurality of rotor discs, respectively, to be filled with beads, and an upper region is defined in the mill above the respective top one of the one or more stator discs and the top one of the plurality of rotor discs to accept beads that pass upward through the mill.

* * * * *